United States Patent [19]

Furukawa et al.

[11] 4,006,113
[45] Feb. 1, 1977

[54] NOVEL COATING COMPOSITION CONTAINING ACETYLENE-CONJUGATED DIENE RANDOM COPOLYMERS

[75] Inventors: Junji Furukawa, Kyoto; Eiichi Kobayashi; Takahiro Kawagoe, both of Uji, all of Japan

[73] Assignee: Bridgestone Tire Company Limited, Tokyo, Japan

[22] Filed: Sept. 9, 1974

[21] Appl. No.: 504,032

[30] Foreign Application Priority Data

Sept. 12, 1973 Japan .............................. 48-102229
Sept. 12, 1973 Japan .............................. 48-102230

[52] U.S. Cl. .......................... 260/23.7 R; 252/47; 260/879; 260/42; 260/881; 260/882; 260/883; 260/885; 260/886; 260/887; 260/890; 260/894; 526/285

[51] Int. Cl.² .......................................... C08L 91/00

[58] Field of Search .......... 260/94.1, 42.47, 23.7 R, 260/879, 881, 882, 883, 885, 886, 887, 890, 894; 252/47

[56] References Cited

UNITED STATES PATENTS

| | | | |
|---|---|---|---|
| 1,812,849 | 6/1931 | Collins | 260/94.1 |
| 1,903,500 | 4/1933 | Calcott | 260/94.1 |
| 2,721,185 | 10/1955 | Schulze | 260/5 |
| 3,352,817 | 11/1967 | Meyer | 260/45.7 |
| 3,427,364 | 2/1969 | Shaw | 260/94.1 |
| 3,464,952 | 9/1969 | Larson | 260/45.7 |
| 3,534,015 | 10/1970 | Peters | 260/94.1 |
| 3,645,999 | 2/1972 | Byrd | 260/94.1 |
| 3,803,110 | 4/1974 | Richards | 260/94.1 |
| 3,886,127 | 5/1975 | Furukawa | 260/94.1 |
| R20,777 | 7/1938 | Calcott | 260/94.1 |

OTHER PUBLICATIONS

Railsback, "Butadiene Styrene Block Copolymer", Rubber Age, Jan. 1964, pp. 583 to 589.

*Primary Examiner*—Lewis T. Jacobs
*Assistant Examiner*—William E. Parker
*Attorney, Agent, or Firm*—Stevens, Davis, Miller & Mosher

[57] ABSTRACT

A novel coating composition can be obtained by compounding 100 parts by weight of (A) acetylene-conjugated random copolymer having an acetylene unit content of 5–60 mol% and a block character P of 0.8–1.2 and 5–1,000 parts by weight of (B) carbon-carbon double bond-containing compound. The resulting coating composition shows a rapid curing velocity, which has never been seen, and provides an excellent coating film.

When the above described composition is added with (C) a curing promoter or a radical initiator, the curing velocity is more increased and when the above described composition is added with (D) a filler or a pigment, excellent coating films suitable for various applications can be formed.

10 Claims, 1 Drawing Figure

NOVEL COATING COMPOSITION CONTAINING ACETYLENE-CONJUGATED DIENE RANDOM COPOLYMERS

BACKGROUND OF THE INVENTION (1) Field of the Invention

The present invention relates to a novel coating composition and more particularly a novel coating composition obtained by compounding 100 parts by weight of an acetylene-conjugated random copolymer (A) having an acetylene unit content of 5–60 mol% and a block character P of 0.8–1.2 with 5–100 parts by weight of a carbon-carbon double bond-containing compound (B).

Furthermore, the addition of a curing promotor or a radical initiator (C) to the above described composition provides a coating composition showing a rapid curing velocity. Furthermore, when a filler or a pigment (D) is compounded depending upon the using object, a composition to form an excellent coating film can be obtained.

(2) Description of the Prior Art

At present, the demand of curable high molecular weight materials has been more increased in order to produce paints, printing inks, coloring materials, adhesives, sealing materials, coating materials, various film-shaped moldings and gaskets. For the purpose, curable compositions of various synthetic resins have been developed but they have not been satisfied in view of the curing velocity, the properties of the resulting cured products and the cost.

The base materials of the coating compositions, such as the above described paints, include natural drying oils, for example, linseed oil or low molecular weight liquid polybutadiene polymers.

However, in many cases, they cannot be satisfied in view of the above described curing velocity and severe curing conditions should be selected.

The present invention relates to novel coating compositions having a rapid curing velocity, which has never been attained in the conventional coating materials, and providing an excellent cured film, which consists of an acetylene-conjugated diene random copolymer having an acetylene unit content of 5–60 mol% and a block character P of 0.8–1.2 defined hereinafter and a carbon-carbon double bond-containing compound mentioned hereinafter.

The inventors have found that acetylene and conjugated diene effect a random copolymerization by using some catalyst in the couse of study of the acetylene compounds.

Heretofore it has been known that acetylene is polymerized by various catalysts as well as Ziegler catalyst. In this case, the resulting acetylene polymers are always black resinous acetylene polymers. Some copolymerizations with conjugated diene have been attempted but in any case, the resulting polymers are black resinous ones and contain the acetylene block and the random copolymers having viscosity and elasticity as found by the inventors of the present invention have never been obtained.

The inventors have investigated in detail with respect to the acetylene-conjugated diene random copolymers, particularly acetylene-butadiene copolymer and acetyleneisoprene copolymer obtained by the invention already found and filed by the inventors as mentioned above and found that the unexpected excellent coating compositions can be obtained by combining the compounding agents as mentioned hereinafter and the present invention has been accomplished.

SUMMARY OF THE INVENTION

The present invention provides a novel coating composition obtained by compounding a component (A) of 100 parts by weight of an acetylene-conjugated diene random copolymer having an acetylene unit content of 5–60 mol% and a block character P of 0.8–1.2 and a component (B) of 5–1,000 parts by weight of a carbon-carbon double bond-containing compound at a temperature of 0° to 300° C.

The component (B) is at least one of a component (a) of drying oil, and semi-drying oil, a component (b) of rubber containing a conjugated diene as one component, and a component (c) of vinyl-substituted aromatic hydrocarbons, acrylonitrile, $\alpha,\beta$-unsaturated carboxylic acids and the derivatives thereof, vinyl esters, vinylpyridine, halogenated vinyls, dibasic acids having unsaturated bond and the derivatives thereof, vinyl silanes and conjugated dienes.

The coating composition of the present invention can be prepared by merely compounding the components (A) and (B), or by firstly reacting the component (A) with the component (C) of the component (B) at a temperature of 0 to 300° C to prepare a monomer-adduct of the acetylene-conjugated diene random copolymer and then compounding the resulting monomer-adduct with the component (a) or (b) of the component (B). Alternatively, the above prepared monomer adduct may directly be used after dilution with a solvent.

One of the characteristics of the coating composition of the present invention is that an adduct of the acetylene-conjugated diene random copolymer with the component (B) of the carbon-carbon double bond-containing compound is easily formed by merely compounding the random copolymer and the component (B). Presumably, this serves to form the excellent film as the coating composition. Such rapid reactivity of the acetylene-conjugated diene random copolymer has never been seen in the conventional polymers, for example, liquid polybutadiene and other polymers.

When the coating composition composed of the above described components (A) and (B) is compounded with a curing promoter or radical initiator as a component (C), a coating composition having a more rapid curing velocity can be obtained.

Furthermore, when the above obtained coating composition is compounded with a filler or a pigment as a component (D), a coating composition which forms more excellent film, can be obtained.

DETAILED DESCRIPTION OF THE PREFERRED EMBODIMENT

The conjugated diene, which is one component monomer of the acetylene-conjugated diene random copolymer (A) to be used in the present invention, is a compound having the following general formula wherein $R^1$ and $R^2$ represent hydrogen atoms, halogen atoms or hydrocarbon residues having 1–6 carbon atoms. Among the conjugated dienes, butadiene, isoprene, chloroprene and 2,3-dimethylbutadiene are preferable.

The acetylene-conjugated diene random copolymer having an acetylene unit content of 1–70 mol% may be used in the present invention. The random copolymer is entirely different in the property from conjugated diene homopolymer, acetylene homopolymer and acetylene-conjugated diene block copolymer. However, the random copolymer having an acetylene unit content of 5–60 mol% is suitable for the purpose of the present invention. When the acetylene unit content is less than 5 mol%, the curing velocity is lower, and when the content is more than 60 mol%, the properties of the coating films are degraded. Therefore, the random copolymer having an acetylene unit content outside the above described range is not preferable in the present invention.

It is necessary that the copolymer to be used in the present invention is a so-called random copolymer wherein the acetylene unit and the conjugated diene unit are distributed statistically randomly in the polymer chain depending upon the contents of respective units. The block character P, which is used as a measure of randomness of copolymer, is defined as follows in the case of, for example, acetylene-butadiene random copolymer.

Figure 1:
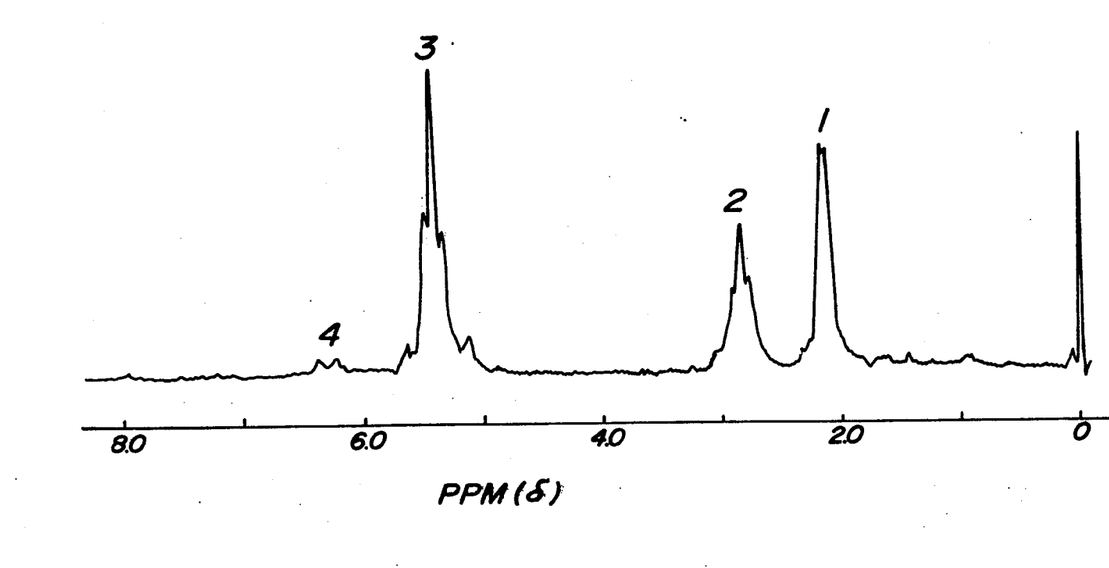
The single Figure is one embodiment of the nuclear magnetic resonance spectrum of the acetylene-butadiene random copolymer to be used in the present invention.

The single Figure is one embodiment of the nuclear magnetic resonance spectrum of the acetylene-butadiene copolymer to be used in the present invention, which is measured in a deuterochloroform solution at 60 MHz and at room temperature by using tetramethylsilane as an internal standard. In the case when butadiene is bonded in 1,2-type, an absorption due to $=CH_2$ protons of $-CH=CH_2$ appears at 4.80–5.01. However, since this absorption does not substantially appear in the nuclear magnetic resonance spectrum of the copolymer of the present invention, the copolymer has substantially no 1,2-bond, and substantially all of the butadiene units are bonded in 1,4-type. Furthermore, since it has already been confirmed from the infrared absorption spectrum that almost all of the double bonds are present in cis-type in the copolymer, butadiene is copolymerized in cis-type. The nuclear magnetic resonance spectrum of the copolymer has four main absorptions, and the absorptions are assigned as shown in the following Table.

| Peak No. | δ-Value (ppm) | Assignment |
|---|---|---|
| 1 | 2.12 | $-CH_2-\underline{CH_2}-CH=CH-$ |
| 2 | 2.82 | $-CH=CH-\underline{CH_2}-CH=CH-$ |
| 3 | 5.40 | $-CH_2-\underline{CH}=\underline{CH}-CH_2-$ |
| 4 | ~6.30 | $-CH_2-\underline{CH}=\underline{CH}-\underline{CH}=\underline{CH}-CH_2-$ |

The peak at 2.12 δ is assigned to methylene protons of butadiene unit of the butadiene-butadiene diad, which are shown by H in the following formula.

The peak at 2.82 δ is assigned to methylene protons of butadiene unit of the acetylene-butadiene diad, which are shown by H in the following formula:

This peak shows that acetylene and butadiene are copolymerized.

The peak at 5.40 δ is assigned to methine protons of butadiene unit and those of acetylene unit isolated by butadiene units, which are shown by H in the following formulae:

The broad and very low peak at ~6.30 δ is assigned to methine protons of acetylene unit of the acetylene-acetylene diade, which are shown by H in the following formula:

Since no peak is observed in a field lower than this peak, it can be seen that three or more acetylene sequences are substantially absent from the copolymer. That is, it can be seen that acetylene is not bonded to form blocks.

The molar fraction of acetylene unit in the copolymer can be calculated from the following formula:

$$A = 1 - (R/2)$$

In the formula,
A: molar fraction of acetylene unit in the copolymer.

$$R: \frac{(\text{area at } 2.12\delta) + (\text{area at } 2.82\delta)}{(\text{area at } 5.40\delta) + (\text{area at } 6.30\delta)}$$

Then, it can be determined by the diad fractions of monomer unit sequences whether the copolymer is random or block, said diad fractions being calculated from the following formulae:

$$F_{BB} = \frac{B}{1+R'}$$

In the above formulae,
$F_{BB}$: diad fraction of the butadiene-butadiene sequence,
$F_{AB}$: diad fraction of the acetylene-butadiene sequence,
$F_{AA}$: diad fraction of the acetylene-acetylene sequence,
B : molar fraction of butadiene unit in the copolymer (B=1−A), $$R': \frac{\text{area at } 2.82\delta}{\text{area at } 2.12\delta}$$

The diad fractions of the copolymer of the present invention calculated in this manner were substantially agreed with the following theoretical values when it was assumed that acetylene and butadiene were randomly copolymerized.

$F_{BB} = B^2$
$F_{AB} = 2AB$
$F_{AA} = A^2$

Therefore, it was found that the copolymer of the present invention was a random copolymer of acetylene and butadiene.

Furthermore, the block character P, which is used as one of the measures of the randomness, is shown by the following formula.

$$P = \frac{F_{AB} \text{ (from experimental value)}}{F_{AB} \text{ (from random assumption)}}$$

P being 1 means random copolymer,
P being << 1 means block copolymer, and
P being >> 1 means alternating copolymer.

In the present invention, random copolymers having a block character P of 0.8–1.2, particularly 0.9–1.1, are preferably used. The more a random copolymer resembles a block copolymer in the structure, the lower the properties of the coating films are, and further the resulting coating films are apt to become non-uniform.

The component (B) of the carbon-carbon double bond-containing compounds to be used in the present invention includes 2. drying oils, and semi-drying oils;
b. rubbers, one component of which is a conjugated diene; and
c. vinyl substituted aromatic hydrocarbon, acrylonitrile, $\alpha,\beta$-unsaturated carboxylic acids and the derivatives thereof, vinyl esters, vinyl pyridine, halogenated vinyl, dibasic acids having unsaturated bond and the derivatives thereof, vinyl silanes and conjugated dienes.

The component (a) is, for example, natural drying oils, semi-drying oils and the modified oils thereof, for example, linseed oil, soybean oil, tung oil, fish oil, castor oil, coconut oil, hemp-seed oil, cotton seed oil, dehydrated castor oil, isomerized oil, styrenated oil, cyclopentadiene copolymerized oil, maleinated oil and the like; alkyd resins, for example, drying oil modified alkyd resin, rosin modified alkyd resin, styrenated alkyd resin and the like; synthetic drying oils, for example, unsaturated fatty acid esters of polyhydric alcohols, such as pentaerythritol, sorbitol and the like; drying resinous bodies, such as petroleum resin and the like.

The component (b) is natural rubber, synthetic rubbers, such as polybutadiene, polyisoprene, polychloroprene, styrene-butadiene copolymer, acrylonitrile-butadiene copolymer, butadiene-propylene copolymer, butadiene-isobutylene copolymer and the like.

The component (c) includes styrene and styrene derivatives, such as $\alpha$-methylstyrene, $\alpha$-butylstyrene, $\alpha$-phenylstyrene, p-methoxystyrene, p-methylstyrene, p-i-propylstyrene, p-t-butylstyrene, m-chlorostyrene, p-chlorostyrene, p-bromostyrene, p-fluorostyrene, p-cyanostyrene, p-phenoxystyrene, p-nitrostyrene, p-acylstyrene, p-dimethylaminostyrene, p-trimethylsilylstyrene, divinylbenzene, and the like; acrylonitrile, methacrylonitrile, acrylic acid, methacrylic acid, acrylic acid esters, such as methyl acrylate, ethyl acrylate, isopropyl acrylate, n-butyl acrylate, t-butyl acrylate, n-amyl acrylate, n-octyl acrylate, vinyl acrylate, allyl acrylate, phenyl acrylate, benzyl acrylate, cyclohexyl acrylate; methacrylic acid esters, such as methyl methacrylate, ethyl methacrylate, n-propyl methacrylate, i-propyl methacrylate, i-butyl methacrylate, n-butyl methacrylate, s-butyl methacrylate, t-butyl methacrylate, phenyl methacrylate, benzyl methacrylate, cyclohexyl methacrylate, trityl methacrylate, acrylic amide; N-substituted and N,N-disubstituted acrylic amides, such as N-methyl acrylic amide, N-ethyl acrylic amide, N-n-butyl acrylic amide, N-n-hexyl acrylic amide, N,N-dimethyl acrylic amide, N,N-methyl ethyl acrylic amide and the like; vinyl esters, such as vinyl formate, vinyl acetate, vinyl propionate, vinyl caproate, vinyl valerate, vinyl butyrate, vinyl benzoate, vinyl trimethylacetate, vinyl monochloroacetate, vinyl dichloroacetate, vinyl trichloroacetate, vinyl trifluoroacetate and the like; vinyl pyridine, vinylidene chloride, vinyl bromide, vinylidene bromide, allyl chloride, maleic acid, maleic anhydride, dialkyl maleate, diallyl maleate, maleinimide, fumaric acid, dialkyl fumarate, diallyl fumarate and the like; silicone compounds, such as (trimethyl siloxy)-vinyldimethylsilane, bis-(trimethylsiloxy)-vinylmethylsilane, tris-(trimethylcycloxy) vinylsilane and the like; conjugate dienes, such as isoprene, chloroprene, pentadiene-1,3, hexadiene-1,3, dimethylbutadiene and the like.

In the present invention, curable compositions, which can provide excellent coating compositions, can be obtained by compounding the above described component (A) with the component (B). In this case, the amount of the component (B) is generally 5–1,000 parts by weight based on 100 parts by weight of the component (A) and this amount may be conveniently selected depending upon the using object. Among them, the amount of 10–500 parts by weight is preferable.

The above described coating composition may be directly used or may be used after dissolved in a solvent. When using the solvent, the solvents to be used are, for example, hydrocarbons, such as hexane, heptane, petroleum ether, solvent naptha, turpentine oil, mineral spirit, benzene, toluene, xylene, ethyl benzene, cyclohexane and the like; chlorinated hydrocarbons, such as carbon tetrachloride, chloroform, dichloromethane, dichloroethane, dichloropropane, tetrachlororethylene, chlorobenzene and the like; ether compounds, such as methyl ether, ethyl ether, dioxane, tetrahydrofuran, dimethoxyethane, and the like; ester compounds, such as ethyl acetate, butyl acetate and the like. The amount of the solvent to be used is not particularly limited but is generally 1–1,000 parts by weight based on 100 parts by weight of the component (A). The solvent is added in order to reduce the viscosity of the composition and to make the coating and molding and the like easy, and the addition of an excess amount of the solvent is not preferable.

When the component (C) of the curing promoter or radical initiator is added to the coating composition of the present invention, the more rapid curing velocity can be obtained. The curing promoter to be used herein is a cobalt compound, a manganese compound, an iron compound, a lead compound, a zinc compound or a calcium compound. For example, the curing promoters are oxides, hydroxides, halides, nitrates, carbonates, sulfates, and other inorganic acid salts of the above described metals; organic salts of the above described metals, such as acetates, formates, octenoates, oleates, stearates, oxalates, lactates, benzoates, linoleates, linolenates, naphthenates, resin acid salts, abietates, linseed oil fatty acid salts, soybean oil fatty acid salts and the like; organic complex compounds of the above described metals, such as acetyl acetate, cyclopentadinyl compounds and the like. Among them, the organic acid salts and organic complex compounds, which have a high compatibility with the random copolymer of the component (A) to be used in the present invention, are preferable. The radical initiator is an azonitrile or an organic peroxide.

The radical initiators to be used herein are, for example, azonitrile compounds, such as, azobisisobutyronitrile, 2,2'-azobis(2,4- dimethyl-valeronitrile) and the like; ketone peroxides, such as methyl ethyl ketone peroxide, cyclohexanone peroxide and the like; hydroperoxides, such as t-butyl hydroperoxide, cumenehydroperoxide, di-i-propylbenzene hydroperoxide, p-methane hydroperoxide, 2,5-dimethylhexane-2,5-dihydroperoxide and the like; dialkyl peroxides, such as di-t-butylperoxide, t-butycumyl peroxide, dicumyl peroxide, $\alpha,60$ '-bis(t-butylperoxy) p-di-i-propylbenzene, 2,5-dimethyl-2,5-di(t-butylperoxy)hexane, 2,5-dimethyl-2,5-di(t-butylperoxy)hexyne and the like; diacylperoxides, such as acetyl peroxide, propionyl peroxide, i-butyral peroxide, octanoyl peroxide, decanoyl peroxide, lauroyl peroxide, stearoyl peroxide 3,5,5-trimethylhexanoyl peroxide, succinic acid peroxide, benzoyl peroxide, t-chlorobenzoyl peroxide, 2,4-dichlorobenzoyl peroxide, di-i-propylperoxy dicarbonate, di-2-ethylhexylperoxy dicarbonate and the like; peroxy esters, such as t-butyl peroxyacetate, t-butyl peroxyisobutyrate, t-butyl peroxypivalate, t-butyl peroxy-2-ethylhexanoate, t-butyl peroxylaurate, t-butyl peroxybenzoate, di-t-butyl diperoxyphthalate, 2,5-dimethyl-2,5-di(benzoylperoxy)hexane, t-butyl peroxymaleic acid, t-butyl peroxy-i-propylcarbonate and the like; acetylcyclohexylsulfonyl peroxide and the like.

The ratio of the component (C) to the component (A) is usually 0.001–10% by weight, preferably 0.001–5% by weight.

In the present invention, the component (D) of the filler or pigment may be added depending upon the object. The filler is, for example, inorganic substances, such as carbon black, zinc white, clay, magnesium carbonate, silica, silicate, calcium carbonate, diatomaceous earth, talc, mica, chalk, barite, lithopane, asbestos, graphite, pumice, glass fiber, glass powder, carbon fiber and the like; organic substances, such as coumaroneindene resin, phenol resin, high styrene-butadiene resin, cyclized rubber, synthetic fiber, natural fiber and the like.

As the pigment, use may be made of well-known inorganic pigments and organic pigments.

The amount of the component (D) to be used varies depending upon the object and usually 1-1,000 parts by weight based on 100 parts by weight of the compound (A) and especially when the coating composition is used as a paste paint, the component (D) is usually added in an amount of 500–1,000 parts by weight based on 100 parts by weight of the component (A), while when using as a prepared paint, the amount is usually 100–300 parts by weight and when using as a coloring film, the amount is usually 1–30 parts by weight.

For the preparation of the coating composition of the present invention, the above described components (A) and (B) are treated at a temperature of 0° to 300° C, if necessary by adding a solvent, the component (C) and/or the component (D). In this case, the component (A) and the component (B) may be previously treated or reacted and then the resulting composition may be compounded with additionally the component (C) and/or the component (D).

The coating composition obtained in the present invention can provide excellent coating compositions, which are far more rapid in the curing reaction than the well-known conventional drying oil and reactive polymers.

The following examples are given for the purpose of illustration of this invention and are not intended as limitations thereof. In the examples, "part" means part by weight.

EXAMPLE 1

A random copolymer of acetylene and butadiene was synthesized in the following manner. Into a glass reaction vessel of 1 l capacity, the interior of which was previously purged with nitrogen, were charged 350 ml of toluene and 15 mmoles of nickel naphthenate (in the form of a 0.5 mol/l hexane solution). The catalyst solution was kept at 30° C, added with 75 mmoles of diethylaluminum chloride (in the form of a 2 mol/l hexane solution) and further kept at 30° C for 10 minutes under stirring to age the catalyst. A gaseous mixture of acetylene (0.24 mol/hr) and butadiene (0.45 mol/hr) was introduced into the catalyst solution at 30° C for 3.5 hours to effect a polymerization reaction of the acetylene and butadiene. After the reaction, the reaction mass was poured into methanol to precipitate the reaction product. From the reaction product, 70 g of a chloroform-soluble copolymer was obtained.

The infrared absorption spectrum of the resulting copolymer was measured in a carbon disulfide solution, and the microstructure of the double bond of the copolymer was determined according to the Morero method (D. Morero et al, Chim. e. Ind., 41, 758 (1959). As the result, it was found that the microstructure of the double bond of the copolymer was composed of 84% of cis-type bond, 10% of trans-type bond and 6% of vinyl-type bond. The copolymer had an intrinsic viscosity $[\eta]$ of 0.1 in toluene at 30° C.

The composition and randomness of the copolymer were analysed in the following manner by the nuclear magnetic resonance spectrum. The copolymer was dissolved in deuterochloroform, and its nuclear magnetic resonance spectrum was measured at 60 MHz by using tetramethylsilane as an internal standard at room temperature. The nuclear magnetic resonance spectrum of the copolymer had four main peaks, which were assigned as follows.

The peak at 2.12 $\delta$ is assigned to methylene protons of butadiene unit of the butadiene-butadiene diad.

The peak at 2.82 $\delta$ is assigned to methylene protons of butadiene unit of the acetylene-butadiene diad.

The peak at 5.40 $\delta$ is assigned to methine protons of butadiene unit and those of acetylene unit isolated by butadiene units.

The broad and very low peak at ~6.30 $\delta$ is assigned to methine protons of acetylene unit of the acetylene-acetylene diad.

The peak at 2.82 $\delta$ indicates the presence of diallyl type active methylene structure, and the peak at ~6.30 $\delta$ indicates the presence of conjugated diene type structure.

The molar fraction of acetylene unit in the copolymer can be calculated from the following formula.

$$A = 1 - (R/2)$$

In the formula,
A : molar fraction of acetylene unit in the copolymer $$R : \frac{(\text{area at } 2.12\delta) + (\text{area at } 2.82\delta)}{(\text{area at } 5.40\delta) + (\text{area at } 6.30\delta)}$$

From the measured value, A was calculated to be 0.318. That is, the acetylene unit content of the copolymer was 31.8 mol%.

Then, it can be determined by the diad fractions of monomer unit sequences whether the copolymer is random or block, said diad fractions being calculated from the following formulae.

$$F_{BB} = \frac{B}{1+R'}$$

$$F_{AB} = 2R' \cdot F_{BB}$$
$$F_{AA} = 1-(F_{AB}-F_{BB})$$

In the above formulae,
$F_{BB}$: diad fraction of the butadiene-butadiene sequence,
$F_{AB}$: diad fraction of the acetylene-butadiene sequence,
$F_{AA}$: diad fraction of the acetylene-acetylene sequence,
B : molar fraction of butadiene unit in the copolymer (B=1−A), $$R' = \frac{\text{area at } 2.82\delta}{\text{area at } 2.12\delta}$$

The diad fractions of the copolymer calculated in this manner from the measured values were as follows.
$F_{BB} = 0.47$
$F_{AB} = 0.43$
$F_{AA} = 0.10$ While, if it is assumed that acetylene and butadiene are randomly copolymerized, the theoretical values of the diad fractions are as follows.
$F_{BB} = B^2 = 0.47$
$F_{AB} = 2AB = 0.42$
$F_{AA} = A^2 = 0.11$ Therefore, the measured values and the theoretical values of the diad fractions were agreed with each other very well, and it was found that the copolymer synthesized in this Example 1 was a random copolymer of acetylene and butadiene.

Further, in the copolymer, the above defined block character P was calculated as follows.

$$P = \frac{F_{AB} \text{ (from experimental value)}}{F_{AB} \text{ (from random assumption)}} = \frac{0.43}{0.42} = 1.02$$

Therefore, the copolymer was clearly a random copolymer.

A coating composition was prepared by compounding 100 parts of the above obtained acetylene-butadiene random copolymer, 30 parts of 1,2-polybutadiene having a number average molecular weight of 1130 (trademark B-1000, made by Nihon Soda Co.) and 0.1 part, calculated as metal, of cobalt naphthenate. The coating composition was applied on a glass plate in a thickness of about 30 μ, and cured at room temperature for a given time as shown in the following Table 1 to form a coating film.

For comparison, 100 parts of each drying oils of tung oil and linseed oil, and liquid rubbers of B-1000 and a butadiene-isobutylene copolymer having a number average molecular weight of about 550 and an iodine value of 190 (trademark SK-1000, made by Tonen Sekiyu Co.) was compounded with 0.1 part, calculated as metal, of cobalt naphthenate to prepare a coating composition. The resulting coating composition was applied on a glass plates and cured in the same manner as described above to form a coating film.

The curing rate of the coating film was determined by the following formula $$\text{Curing rate (\%)} = \frac{R}{A} \times 100$$

In the formula
R : Amount of the residue after the extraction of the coating film in toluene
A : Applied amount of the coating composition.

The obtained results are shown in the following Table 1. It can be seen from the Table 1 that the coating composition of the present invention is completely cured in a very short period of time.

Table 1

| Sample | | Curing time (day) | Curing rate (%) |
|---|---|---|---|
| Example 1 | Mixture of acetylene-butadiene random copolymer and B-1000 | 1 | 103 |
| | | 2 | 114 |
| Comparative Example 1 | Tung oil | 1 | 55 |
| | | 2 | 80 |
| | | 3 | 92 |
| | | 12 | 100 |
| Comparative Example 2 | Linseed oil | 1 | 25 |
| | | 3 | 51 |
| | | 7 | 76 |
| | | 12 | 77 |
| Comparative Example 3 | B-1000 | 1 | 0 |
| | | 3 | 43 |
| | | 6 | 91 |
| | | 8 | 112 |
| Comparative Example 4 | SK-1000 | 2 | 1 |
| | | 4 | 2 |
| | | 7 | 3 |
| | | 12 | 3 |

EXAMPLE 2

A coating composition was prepared according to the following recipe.

| | |
|---|---|
| Acetylene-butadiene random copolymer (same as used in Example 1) | 100 parts |
| B-1000 | 20 parts |
| Cobalt naphthenate | 0.1 part (calculated as metal) |

The coating composition was applied on a glass plate in a thickness of about 30 μ. The resulting filmy layer cured at room temperature in about 40 minutes to form an excellent coating film.

EXAMPLE 3

A coating composition was prepared according to the following recipe.

| | |
|---|---|
| Acetylene-butadiene random copolymer (same as used in Example 1) | 100 parts |
| B-1000 | 40 parts |
| Manganese naphthenate | 0.1 part (calculated as metal) |

The coating composition was applied on a glass plate in a thickness of about 30 μ. The resulting filmy layer cured at room temperature in about 2 hours.

EXAMPLE 4

A coating composition was prepared according to the following recipe.

| | |
|---|---|
| Acetylene-butadiene random copolymer (same as used in Example 1) | 100 parts |
| B-1000 | 30 parts |

The coating composition was applied on a glass plate in a thickness of about 30 μ. The resulting filmy layer cured at 100° C in about 15 minutes.

EXAMPLE 5

A coating composition was prepared according to the following recipe.

| | |
|---|---|
| Acetylene-butadiene random copolymer (same as used in Example 1) | 100 parts |
| B-1000 | 50 parts |

The coating composition was applied on a glass plate in a thickness of about 30 μ. The resulting filmy layer cured at 100° C in about 60 minutes.

EXAMPLE 6

A coating composition was prepared according to the following recipe.

| | |
|---|---|
| Acetylene-butadiene random copolymer (same as used in Example 1) | 100 parts |
| Linseed oil | 30 parts |

The coating composition was applied on a glass plate in a thickness of about 30 μ. The resulting filmy layer cured at room temperature in about 35 hours.

EXAMPLE 7

A coating composition was prepared according to the following recipe.

| | |
|---|---|
| Acetylene-butadiene random copolymer (same as used in Example 1) | 100 parts |
| SK-1000 | 20 parts |
| Cobalt naphthenate | 0.1 part (calculated as metal) |

The coating composition was applied on a glass plate in a thickness of about 30 μ. The resulting filmy layer cured at room temperature in about 3 hours.

EXAMPLE 8

A coating composition was prepared according to the following recipe.

| | |
|---|---|
| Acetylene-butadiene random copolymer (acetylene unit content: 22.3 mol% | 100 parts |
| Styrene monomer | 360 parts |
| Cobalt naphthenate | 0.1 part (calculated as metal) |

The coating composition was applied on a potassium bromide plate for form a filmy layer having a thickness of about 30 μ. The filmy layer cured at room temperature in about 30 minutes. It was found from the infrared absorption spectrum of the cured film that styrene was contained in the cured film. After one day, the cured film was subjected to an extraction treatment, and the infrared absorption spectrum of the film was measured. There was substantially no change between the films before and after the extraction treatment with chloroform in the infrared absorption spectrum. Accordingly, it was confirmed that styrene was cured together with acetylene-butadiene random copolymer.

EXAMPLE 9

A coating composition was prepared according to the following recipe.

| | |
|---|---|
| Acetylene-butadiene random copolymer (acetylene unit content: 22.5 mol%) | 2 g |
| Methyl methacrylate monomer | 28 g |
| Cobalt naphthenate | 0.002 g (calculated as metal) |

The coating composition was cured at room temperature in a beaker of 100 ml capacity. The composition cured completely in 23 hours to form a block of cured product. The cured product was substantially insoluble in organic solvents. This shows that methyl methacrylate monomer was cured together with acetylene-butadiene random copolymer.

EXAMPLE 10

A coating composition was prepared according to the following recipe.

| | |
|---|---|
| Acetylene-butadiene random copolymer (same as used in Example 1) | 100 parts |
| Toluene | 40 parts |
| Soybean oil-modified alkyd resin[1] | 10 parts |

[1]Trademark R-2301S, made by Nihon Paint, Co., oil length 65%

The coating composition was applied on a glass plate in a thickness of about 30 μ. The resulting filmy layer cured at 100° C in about 120 minutes.

EXAMPLE 11

The same acetylene-butadiene random copolymer as used in Example 1 was used, and an addition reaction of 4-vinylpyridine to the copolymer was effected in the following manner. An egg-plant type flask was charged with 2.00 g of the acetylene-butadiene random copolymer, 2.00 g of 4-vinylpyridine monomer and 50 ml of toluene as a solvent. A reflux condenser was attached to the flask, and the addition reaction was effected at the reflux temperature of toluene for 24 hours. After the reaction, toluene was removed by means of an evaporator, and the reaction mass was washed with a large amount of methanol repeatedly to obtain 2.17 g of a reaction product. Since the homopolymer of 4-vinylpyridine is soluble in methanol, the above obtained result shows that 0.17 g of 4-vinylpyridine was added to the copolymer. It was also confirmed from the infrared absorption spectrum and elementary analysis of the reaction product that 4-vinylpyridine was added to the copolymer.

The resulting addition product of 4-vinylpyridine to acetylene-butadiene random copolymer was dissolved in the equal amount of toluene, and the resulting solution was applied on an aluminum plate alone or together with 0.1 part, calculated as cobalt metal, of cobalt naphthenate to form a filmy layer having a thickness of about 30 $\mu$. The filmy layer was cured at 120° C for about 20 minutes. In both cases, excellent cured films were obtained. Particularly, when cobalt naphthenate was used, an excellent cured film was obtained in about 10 minute curing.

EXAMPLE 12

A monomer addition reaction was effected in the same manner as described in Example 11, except that 0.059 g of benzoyl peroxide was added to the reaction system as a radical initiator. It was found that 0.24 g of 4-vinylpyridine was added to the copolymer. The monomer addition reaction was promoted by the addition of the radical initiator. The resulting monomer addition product formed an excellent cured film.

EXAMPLE 13

A monomer addition reaction was effected in the same manner as described in Example 11, except that 0.040 g of $\alpha,\alpha'$-azobisisobutyronitrile was added to the reaction system as a radical initiator. It was found tht 0.24 g of 4-vinylpyridine was added to the copolymer. The resulting monomer addition product formed an excellent cured film.

EXAMPLE 14

A monomer addition reaction was effected in the same manner as described in Example 11, except that 2.00 g of vinyl acetate was used as a monomer and 30 ml of toluene was used. The reaction mass was washed with methanol, and 2.07 g of a reaction product was obtained. This shows that 0.07 g of vinyl acetate was added to the copolymer. It was also confirmed from the infrared absorption spectrum and elementary analysis of the reaction product that vinyl acetate was added to the copolymer. The resulting monomer addition product formed an excellent cured film.

EXAMPLE 15

An addition reaction of 2 g of styrene monomer to 2 g of the acetylene-butadiene random copolymer synthesized in Example 11 was effected at 80° C for 2 hours in the presence of 0.040 g of benzoyl peroxide in 30 ml of toluene to obtain 2.09 g of a reaction product. It was confirmed from the infrared absorption spectrum of the reaction product that styrene was added to the copolymer. The resulting monomer addition product formed an excellent cured film.

EXAMPLE 16

An addition reaction of 2.00 g of styrene monomer to 2.00 g of an acetylene-butadiene random copolymer having an acetylene unit content of 22.5 mol% was effected in 30 ml of toluene at the reflux temperature of toluene for 24 hours to obtain 2.11 g of a reaction product. It was confirmed from the infrared absorption spectrum and nuclear magnetic resonance spectrum of the reaction product that styrene was added to the copolymer. The resulting monomer addition product formed an excellent cured film.

EXAMPLES 17–19

Into a flask were charged 2.37 g of an acetylenebutadiene random copolymer having an acetylene unit content of 24.0 mol%, variable amounts of maleic anhydride monomer and benzoyl peroxide as shown in the following Table 2 and 100 ml of toluene, and an addition reaction of maleic anhydride monomer to the copolymer was effected at 90° C for 4 hours under stirring. After the reaction, toluene was removed by means of an evaporator to decrease the volume of the reaction mass to about ¼ of the original volume. The reaction mass was precipitated in methanol to obtain an addition reaction product. The amount of maleic anhydride added to the copolymer was determined according to the method disclosed by Frize et al Anal. Chem., 23, 589 (1951). The obtained results are shown in Table 2.

Table 2

| Example No. | Maleic anhydride (g) | Benzoyl peroxide (g) | Added amount of monomer (g) |
|---|---|---|---|
| 17 | 0.65 | 0.156 | 0.32 |
| 18 | 0.65 | 0 | 0.04 |
| 19 | 0.90 | 0 | 0.20 |

It was also confirmed from the infrared absorption spectra of the reaction products that maleic anhydride was added to the copolymer. All of the resulting monomer addition products formed excellent cured films.

COMPARATIVE EXAMPLE 5

An addition reaction of maleic anhydride monomer to 1,2-polybutadiene (B-1000) was effected under the same condition as described in Example 19. However, in this reaction, no maleic anhyride monomer was added to 1,2-polybutadiene. On the contrary, maleic anhydride monomer is easily added to acetylene-butadiene random copolymer even under a mild condition. This shows that the acetyleneconjugated diene random copolymer to be used in the present invention has a high reactivity.

COMPARATIVE EXAMPLE 6

An addition reaction of maleic anhydride monomer to cis-1,4-polybutadiene having an intrinsic viscosity [$\eta$] of 0.15 in toluene at 30° C and a microstructure composed of 81.2% of cis-1,4 bond, 15.9% of trans-1,4 bond and 2.9% of 1,2-bond was effected under the same condition as described in Example 19. However, the amount of maleic anhydride added to cis-1,4-polybutadiene was only 1/40 of the amount of maleic anhydride added to the acetylene-butadiene random copolymer in Example 19.

EXAMPLE 20

A random copolymer of acetylene and isoprene was synthesized in the following manner. Into a glass reaction vessel of 300 ml capacity, the interior of which was previously purged with nitrogen, were charged 70 ml of toluene, 3 mmoles of nickel naphthenate (in the form of a 0.5 mol/l hexane solution) and 15 mmoles of diethylaluminum chloride (in the form of a 2 mol/l hexane solution) in this order. The catalyst was aged at 30° C for 10 minutes. After 0.39 mole of liquid isoprene was added to the catalyst solution, acetylene was introduced into the reaction solution at a constant rate at 30° C for 3 hours so that the total amount of the acetylene was 0.12 mole, whereby a copolymerization reaction of the acetylene and the isoprene was effected. The reaction mass was precipitated in methanol to obtain a reaction product. From the reaction product, 9.5 g of a chloroform-soluble copolymer was obtained. The copolymer had an intrinsic viscosity [$\eta$] of 0.1 at 30° C in toluene. It was confirmed from the nuclear magnetic resonance spectrum of the copolymer that the copolymer contained 43.9 mol% of acetylene units, and acetylene and isoprene were randomly copolymerized in the copolymer. Copolymer had a block character P of 1.0.

An addition reaction of 4-vinylpyridine to the above obtained acetylene-isoprene random copolymer was effected under the same condition as described in Example 12. It was found that 0.10 g of 4-vinylpyridine was added to 2 g of the acetylene-isoprene random copolymer. The monomer addition product formed an excellent cured film.

EXAMPLE 21

A coating composition was prepared according to the following recipe.

| | |
|---|---|
| Acetylene-butadiene random copolymer (acetylene unit content: 24.0 mol%, number average molecular weight: 2,360) | 100 parts |
| Glycidyl methacrylate monomer | 20 parts |
| Cobalt naphthenate | 0.03 part (calculated as metal) |

The coating composition was applied on an aluminum plate in a thickness of about 30 $\mu$. The resulting filmy layer cured at 120° C in 20 minutes to form an excellent coating film.

What is claimed is:
1. A coating composition consisting essentially of
   100 parts by weight of (A) an acetylene-conjugated diene random copolymer having an acetylene unit content of 5–60 mol % and a block character P of 0.8–1.2 and
   5–1,000 parts by weight of (B) a carbon-carbon double bond-containing compound selected from the group consisting of (a) natural drying oil and semi-drying oil selected from the group consisting of linseed oil, tung oil, coconut oil and cotton oil, (b) rubber selected from the group consisting of polybutadiene, polyisoprene, polychloroprene, styrene-butadiene copolymer, butadiene-isobutylene copolymer and butadiene-acrylonitrile copolymer and (c) a monomer selected from the group consisting of styrene, acrylonitrile, methyl methacrylate, acrylamide, vinyl acetate, vinyl pyridine and maleic anhydride.
2. A coating composition consisting essentially of
   100 parts by weight of (A) an acetylene-conjugated diene random copolymer having an acetylene unit content of 5–60 mol % and a block character P of 0.8–1.2,
   5–1,000 parts by weight of (B) a carbon-carbon double bond-containing compound selected from the group consisting of (a) natural drying oil and semi-drying oil selected from the group consisting of linseed oil, tung oil, coconut oil and cotton oil, (b) rubber selected from the group consisting of polybutadiene, polyisoprene, polychloroprene, styrene-butadiene copolymer, butadiene-isoprene copolymer and butadiene-acrylonitrile copolymer and (c) a monomer selected from the group consisting of styrene, acrylonitrile, methyl methacrylate, acrylamide, vinyl acetate, vinyl pyridine and maleic anhydride, and
   0.001–10 parts by weight of (C) at least one of a curing promoter which is an organic acid salt or an organic complex compound of cobalt, manganese, iron, lead, zinc or calcium and a radical initiator which is azobisisobutyronitrile or an organic peroxide.
3. A coating composition consisting essentially of
   100 parts by weight of (A) an acetylene-conjugated diene random copolymer having an acetylene unit content of 5–60 mol % and a block character P of 0.8–1.2,
   5–1,000 parts by weight of (B) a carbon-carbon double bond-containing compound selected from the group consisting of (a) natural drying oil and semi-drying oil selected from the group consisting of linseed oil, tung oil, coconut oil and cotton oil, (b) rubber selected from the group consisting of polybutadiene, polyisoprene, polychloroprene, styrene-butadiene copolymer, butadiene-isobutylene copolymer and butadiene-acrylonitrile copolymer and (c) a monomer selected from the group consisting of styrene, acrylonitrile, methyl methacrylate, acrylamide, vinyl acetate, vinyl pyridine and maleic anhydride and
   1–1,000 parts by weight of (D) at least one of a filler and a pigment.
4. A coating composition consisting essentially of
   100 parts by weight of (A) an acetylene-conjugated diene random copolymer having an acetylene unit content of 5–60 mol % and a block character P of 0.8–1.2,
   5–1,000 parts by weight of (B) a carbon-carbon double bond containing compound selected from the group consisting of (a) natural drying oil and semi-drying oil selected from the group consisting of linseed oil, tung oil, coconut oil and cotton oil, (b) rubber selected from the group consisting of polybutadiene, polyisoprene, polychloroprene, styrene-butadiene copolymer, butadiene-isobutylene copolymer and butadiene-acrylonitrile copolymer and (c) a monomer selected from the group consisting of styrene, acrylonitrile, methyl methacrylate, acrylamide, vinyl acetate, vinyl pyridine and maleic anhydride,
   0.001–10 parts by weight of (C) at least one of a curing promoter which is an organic acid salt or an organic complex compound of cobalt, manganese, iron, lead, zinc or calcium and a radical initiator which is azobisisobutyronitrile or an organic peroxide and
   1–1,000 parts by weight of (D) at least one of a filler and a pigment.
5. A coating composition as claimed in claim 1 wherein said acetylene-conjugated diene random copolymer is acetylene-butadiene random copolymer, acetylene-isoprene random copolymer, acetylene-2,3-dimethylbutadiene random copolymer or acetylene-chloroprene random copolymer.

6. A coating composition as claimed in claim 1, wherein said acetylene-conjugated diene copolymer is acetylenebutadiene random copolymer.

7. A coating composition as claimed in claim 2, wherein said organic peroxide is benzoyl peroxide, cumen hydroperoxide or dicumyl peroxide.

8. A coating composition as claimed in claim 3, wherein said filter is carbon black, zinc white, silica, graphite or calcium carbonate.

9. A coating composition as claimed in claim 1, wherein the component (A) and the component (B) are compounded at 0°–300° C.

10. A coating composition as claimed in claim 2, wherein the component (A) and the component (B) are previously compounded at 0°–300° C and then the resulting composition is added with the component (C).

* * * * *